Feb. 3, 1970     F. W. R. STARP     3,492,930
PHOTOGRAPHIC SELF-COCKING SHUTTER
Filed May 9, 1966
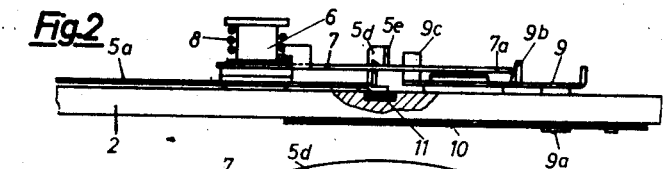
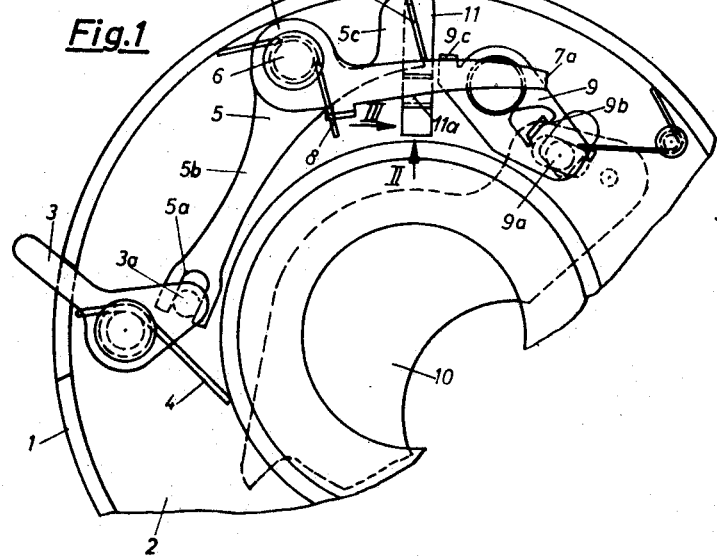
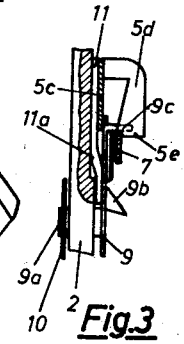
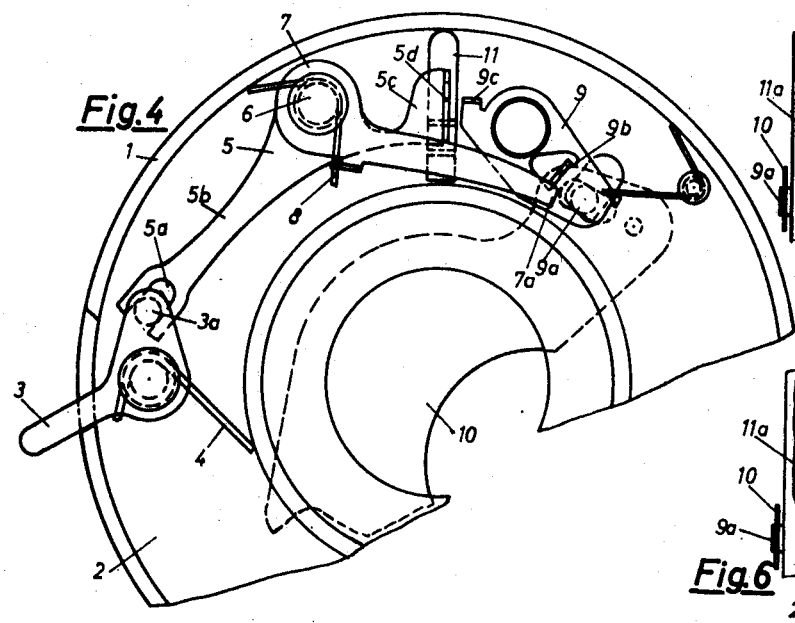
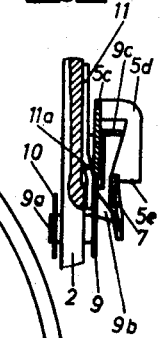
INVENTOR
Franz W. R. Starp
BY Arthur A. March
ATTORNEY

United States Patent Office 3,492,930
Patented Feb. 3, 1970

3,492,930
PHOTOGRAPHIC SELF-COCKING SHUTTER
Franz W. R. Starp, Calmbach, Black Forest, Germany, assignor to Prontor-Werk Alfred Gauthier, G.m.b.H., Calmbach, Black Forest, Germany, a corporation of Germany
Filed May 9, 1966, Ser. No. 548,767
Claims priority, application Germany, May 15, 1965, P 36,808
Int. Cl. G03b 9/10, 9/14
U.S. Cl. 95—59    9 Claims

ABSTRACT OF THE DISCLOSURE

A self-cocking photographic shutter is provided with a cocking and release device and a shutter blade actuating member; a driving lever is engageable with the shutter blade actuating member by means of the cocking and release device for the purpose of driving the blade actuating member. A control member is associated with the cocking and release device and a driving lug is provided on the actuating shutter blade member. The driving lever is adapted to be disengaged from the cocking and release device so that it drops behind the driving lug at the end of the cocking process. The control member includes an inclined surface for lifting the part of the cocking and release device which engages the driving lever at the same time that the driving lever rides up on the driving lug.

---

The present invention relates to a photographic self-cocking shutter having a driving lever which can be caused to engage and drive a shutter blade actuating member, by means of a cocking and release device.

Known to the art, is a shutter of this type in which the depression of the cocking and release lever results, sequentially, in conveying a driving lever into cocked position and in actuating an arresting lever. The driving lever, thereby, first drops behind a driving lug of the shutter blade actuating lever, and is then disengaged from the cocking and release lever, upon a given amount of overtravel. As a result, the driving lever engages the driving lug due to the action of the driving spring. These movements, produce audible effects which may lead the photographer to the erroneous conclusion that the shutter has been released. Therefore, the photographer may omit to release the shutter since he is under the impression that this act has, already, been carried out. This erroneous belief on the part of the photographer may be reinforced by the fact that the resistance of the cocking and release lever diminishes considerably at the same time that the sound generated by the disengagement of the driving lever is heard, even though the shutter has not, as yet, been released. The release process occurs only after further depression of the cocking and release lever in order to actuate the arresting lever. In contrast to the driving lever, the arresting lever is loaded by a comparatively weak restoring spring.

It is therefore an object of the present invention to provide a self-cocking shutter in which the actuation of the cocking and release lever is not accompanied by any audible sounds.

It is another object of the present invention to provide a self-cocking shutter in which the cocking moment increases continuously until the release point is reached.

A further object of the present invention is to provide a shutter which carries out the aforementioned desirable feautres with simple structural means.

The invention solves the indicated problem by providing that a fixed control member be associated with the cocking and release device. The arrangement is such that, at the end of the cocking process, the driving lever is positively disengaged from the cocking and release device while dropping behind a driving lug provided on the shutter blade actuating member. With this design, the photographer can no longer be led to any erroneous conclusions with regard to the release of the shutter. The present invention provides that only the executing motion of the shutter generate any sound, and that the cocking moment be continuously increased until the release point is reached. In this manner, the photographer will continuously depress the cocking and release lever until the release point of the shutter is reached, and a proper exposure is realized each time. Since the release of the driving lever coincides with the dropping of the latter behind the driving lug of the shutter blade actuating lever, no irregularities prevail in the cocking motion when the driving lever is transferred into the cocked position. In order to become disengaged from the cocking and release device, the driving lever need not execute any overtravel. In this manner, the dropping and the separating motion of the driving lever does not generate any sounds. The invention has also the advantage of not requiring a special arresting lever, and thus allow the shutter to be simpler and more reliably operating.

The invention further provides that the control member include an inclined surface which lifts the part of the cocking and release device that engages the driving lever at the same time that the latter rides up the driving lug. This lifting motion occurs with the same movement by which the free end of the driving lever is moved by the driving lug. This results in the avoidance of relative motions between the driving lever and the part of the cocking and release device, which engages the driving lever during the cocking of the shutter. In this manner, the shutter can be cocked easily and the wear of the shutter members is held to a minimum. The part of the cocking and release device which actuates the driving lever is lifted, by the control member, in the same direction as the driving lever by the driving lug, and is held in this position after the driving lever has dropped behind the driving lug. Accordingly, the process of separation between the driving lever and the cocking and release device takes place in a direction which is perpendicular to the plane of motion of these members. The control member is preferably formed of a small guide plate which is bent to form a slope, and which is firmly mounted to the base plate or to the housing bottom of the shutter.

Another feature of the invention resides in the design in which the cocking and release device comprises a two-armed intermediate lever which is positioned coaxially with the driving lever and which is cooperably connected to a cockng and release lever at one end. The other end of the two-armed intermediate lever can be influenced by the control member, and is provided with a hook-shaped lug which engages the driving lever. This design permits the use of a relatively strong driving spring without requiring that the photographer apply a greater force to transfer the driving lever into the cocked position. Aside from this, the special design of the cocking and release device assures extremely reliable performance of the shutter.

An embodiment of the invention is described in the following specification taken in conjunction with the accompanying drawing in which:

FIGURE 1 is a partial top view of the self-cocking shutter, with the cover plate removed, and in the normal or non-operating position;

FIGURE 2 is a side view of the lever arrangement shown in FIGURE 1 and taken along the direction indicated by the arrow II;

FIGURE 3 is a side view of the control member and of the intermediate lever engaging the driving lever, taken in the direction of arrow III in FIGURE 1;

FIGURE 4 is a partial top view of the self-cocking shutter with the cover plate removed, and shows the shutter transferred into cocked position prior to the executing motion;

FIGURE 5 is a side view corresponding to the one of FIGURE 3, and shows the driving lever and the lug of the intermediate lever acting on said driving lever, in the final phase of the cocking motion;

FIGURE 6 is a side view showing the driving lever in the release position brought about by the dropping of the driving lever behind the driving lug of the shutter blade actuating lever.

Referring to the drawing, 1 indicates the housing of the self-cocking shutter in which the base plate 2 is fixed in the commonly-known manner. Mounted on the base plate 2, is a cocking and release lever 3 which assumes the non-operating position shown in FIGURE 1, due to the action of the restoring spring 4. The cocking and release lever 3 is cooperably connected to the two-armed intermediate lever 5 by means of a pin-slot arrangement. Pin 3a fixed to lever 3, engages slot 5a in the arm 5b of the lever 5 which is positioned on a pin 6 fixed to the base plate 2. At the other arm 5c of the intermediate lever 5, is a hook-shaped lug 5d bent in an upward manner. The front edge 5e of the lug is engaged by a driving lever 7 due to the action of the driving spring 8. The pin 6 serves as the pivot bearing for the driving lever 7.

A shutter blade actuating lever 9 is associated with the driving lever 7. Lever 9 is connected to the shutter blade 10 by means of the pin 9a. Only one shutter blade 10 is shown in the drawing in order not to obscure the latter. The shutter blade actuating lever 9 is provided with a beveled lug 9b. During the cocking of the shutter as illustrated in FIGURE 5, the free end 7a of the driving lever 7 rides up the lug 9b. After the shutter blades 10 have reached the open position, the driving lever 7 engages another lug 9c of the actuating lever 9, and returns the shutter blades 10 to their initial or starting position.

In order to obtain the result by which the driving lever 7 is disengaged from the lug 5d while simultaneously dropping behind the lug 9d, the lever arm 5c carrying the lug 5d is associated with a control member 11 firmly mounted to the base plate. The control member 11 has the shape of a small elongated plate which is provided with a portion 11a bent to form a slope. The arrangement is such that the lever arm 5c rides up the bent portion 11a at the same instant that the free lever end 7a impinges on the beveled edge of lug 9d and is also lifted by the latter. It is of special importance that the lever arm 5c be lifted by the same amount as the free end 7a by the driving lug 9b.

The self-cocking shutter described above and illustrated in the drawing, operates as follows:

When the cocking and release lever 3 is actuated, the intermediate lever 5 cooperably connected to said lever 3 is moved in clockwise direction and out of the starting position shown in FIGURE 1. During this process, the lug 5d of intermediate lever 5 pushes, with its edge 5e, the driving lever 7 in the same direction of rotation. At the same time, driving spring 8 becomes cocked. In the final phase of the cocking motion, the free end 7a rides up the beveled edge of the driving lug 9b and finally arrives in the position shown in FIGURE 5. At the same time, the lever arm 5c with the lug 5d is lifted to the same extent by the bent portion 11a of the control member 11. In this manner, the lug 5d and the lever 7 maintain the same relative position during the cocking. Any drop in pressure of the cocking and release lever 3 has no bearing on the shutter, since the lever 7 returns again to the starting position without pivoting the shutter blade actuating lever 9. When the free end 7a has finally swept fully over the driving lug 9b with continuously increasing cocking moment at the lever 3, the end 7a drops behind the lug, as shown in FIGURE 4, due to the spring tension in the driving lever, without causing any noise.

Since the lug 5d maintains its raised position, the lever 7 slides off the edge 5e and arrives, thereby, in the release position illustrated in FIGURE 6, in which the driving lever is now released for the exposure process. Due to the action of the driving spring 8, the driving lever 7 swings into the open space between the lever arm 5c and the lug 5d, while driving the shutter blade actuating lever 9 in counterclockwise direction. The shutter blades 10 are, thereby, conveyed into open position. Once this position has been reached, the lever 7 is disengaged from the lug 9b and impinges upon the lug 9c, with the result that the shutter blades are transferred into the closing position. Due to the condition that the load is removed from the cocking and release lever 3, the latter and the intermediate lever 5 return to the starting position. As a result, the lever arm 5c slides off the inclined surface 11a and the edge 5e again tensionally engages the driving lever 7.

In case the spring tension produced in the driving lever 7 while the latter rides up the driving lug 9b is not sufficient to separate the driving lever from the edge 5e after the lever has dropped behind the driving lug, the control member 11 may be provided with a repelling edge which guidedly returns the lever to the original plane of motion after the lever has slid off the driving lug.

It will be understood that while the invention has been described in detail in connection with a specific example thereof in order to describe the same this description is not to be considered as a limitation upon the scope of the invention. Variations and modifications may be made without departing from the spirit of the invention or defined in the appended claims.

What is claimed is:

1. A photographic self-cocking shutter including a cocking and release device having an intermediate lever, a drive lever engageable to be actuated by a part of said intermediate lever, a shutter blade actuating member engageable by said drive lever for driving said actuating member, said actuating member having a lug with a beveled edge engageable with said driving lever, a stationary control member cooperating with said cocking and release device, said control member having a bent-up portion engageable with said intermediate lever to lift the part of said intermediate lever engageable with said drive lever, said bent-up portion of said control member being engageable with said intermediate lever simultaneously with the running up of said drive lever on the beveled edge of said lug on said actuating member so that said drive lever slides past said lug and finally snaps in behind it and at the same time is disengaged from said intermediate lever.

2. A photographic self-cocking shutter with a cocking and release device, a shutter blade actuating member, and a driving lever which can be caused to engage said shutter blade actuating member by means of said cocking and release device for the purpose of driving said blade actuating member, characterized by: a control member associated with said cocking and release device; and a driving lug provided on said shutter blade actuating member, said driving lever being guidedly disengaged from said cocking and release device while dropping behind said driving lug at the end of the cocking process and wherein said control member includes an inclined surface for lifting the part of the cocking and release device which engages said driving lever, at the same time said driving lever rides up said driving lug, the amount of said lifting motion being identical to that by which the end of said driving lever is moved by said driving lug.

3. The photographic shutter of claim 1 with a housing, wherein said control member is a guide plate with a sloping bend, and is firmly mounted to the bottom of said shutter housing.

4. The photographic shutter of claim 1 with a base plate, wherein said control member comprises a guide plate having a sloping bend, and being firmly mounted to said base plate.

5. A photographic self-cocking shutter with a cocking and release device, a shutter blade actuating member, and a driving lever which can be caused to engage said shutter blade actuating member by means of said cocking and release device for the purpose of driving said blade actuating member, characterized by: a control member associated with said cocking and release device; and a driving lug provided on said shutter blade actuating member, said driving lever being guidely disengaged from said cocking and release device while dropping behind said driving lug at the end of the cocking process and wherein said control member includes an inclined surface for lifting the part of the cocking and release device which engages said driving lever, at the same time that said driving lever rides up said driving lug.

6. The photographic shutter as defined in claim 1, wherein said control member comprises a guide plate having an inclined surface which lifts a part of said cocking and release device engaging said driving lever.

7. The photographic shutter as defined in claim 1, wherein said cocking and release device comprises a two-armed lever mounted coaxially with said driving lever.

8. The photographic shutter of claim 1 with a cocking and release lever, wherein said cocking and release device comprises a two-armed intermediate lever positioned coaxially with said driving lever and cooperably connected to said cocking and release lever.

9. A photographic self-cocking shutter with a cocking and release device, a shutter blade actuating member, and a driving lever which can be caused to engage said shutter blade actuating member by means of said cocking and release device for the purpose of driving said blade actuating member, characterized by: a control member associated with said cocking and release device; and a driving lug provided on said shutter blade actuating member, said driving lever being guidedly disengaged from said cocking and release device while dropping behind said driving lug at the end of the cocking process and with a cocking and release lever, wherein said cocking and release device comprises a two-armed intermediate lever mounted coaxilly with said driving lever, one end of said intermediate lever subject to being influenced by said control member and having a hook-shaped lug engaging said driving lever, and the other end of said intermediate lever being cooperably connected to said cocking and release lever.

References Cited

UNITED STATES PATENTS

| | | | |
|---|---|---|---|
| 1,678,119 | 7/1928 | Klein | 95—63 |
| 2,020,036 | 11/1935 | Marks | 95—63 |
| 2,382,623 | 8/1945 | Fuerst | 95—63 |

JOHN M. HORAN, Primary Examiner

U.S. Cl. X.R.

95—63